MAGNETIC TWO-ANGLE DEMODULATOR

Filed Feb. 1, 1957 4 Sheets-Sheet 1

INVENTORS
MICHAEL COOPERMAN
& GUSTAVE L. GRUNDMANN
BY [signature]
ATTORNEY

MAGNETIC TWO-ANGLE DEMODULATOR

Filed Feb. 1, 1957 4 Sheets-Sheet 2

INVENTORS.
MICHAEL COOPERMAN &
GUSTAVE L. GRUNDMANN
BY
[signature]
ATTORNEY

MAGNETIC TWO-ANGLE DEMODULATOR

Filed Feb. 1, 1957 4 Sheets-Sheet 3

INVENTORS
MICHAEL COOPERMAN
& GUSTAVE L. GRUNDMANN
BY
ATTORNEY

INVENTORS
MICHAEL COOPERMAN &
GUSTAVE L. GRUNDMANN
BY
ATTORNEY

United States Patent Office 2,899,492
Patented Aug. 11, 1959

2,899,492

MAGNETIC TWO-ANGLE DEMODULATOR

Michael Cooperman, Barrington, and Gustave L. Grundmann, Westmont, N.J., assignors to Radio Corporation of America, a corporation of Delaware Application February 1, 1957, Serial No. 637,677
9 Claims. (Cl. 178—5.4)

This invention relates to a magnetic two-angle demodulator. The invention is particularly useful in a color television receiver for demodulating the chrominance information in the received video signal.

The broadcast color television standards adopted by the Federal Communications Commission on December 17, 1953, provide that a broadcasted radio frequency carrier be modulated with a brightness or luminance signal having frequency components from zero to 4.1 megacycles, and with a chrominance or chroma signal having sideband frequency components extending from 2 to 4.1 megacycles and related to a suppressed color subcarrier frequency of 3.58 megacycles. The chroma signal consists of two sets of sideband frequency components representing variation in color saturation along two different respective hue axes of the chromaticity diagram. The nature of the two phase chroma signal is more completely described starting at page 216 of Color Television Engineering, J. W. Wentworth, McGraw-Hill, 1955. In order to demodulate the chroma signal in a receiver, it is necessary to mix the chroma signal with locally generated oscillations having a frequency and phase synchronously related with the suppressed color subcarrier. For this purpose the back porch of each of the transmitted deflection synchronizing pulses is modulated with a burst of at least eight cycles of the color subcarrier frequency; and at the receiver, the burst is used to control the frequency and phase of a local color subcarrier oscillator or oscillation generator. The output of the oscillator and the received chroma signal are applied in proper phases to a plurality of synchronous demodulators. The outputs of the demodulators are matrixed to produce signals for application to a picture reproducer, such as a three-gun shadow mask color kinescope.

It is an object of this invention to provide an improved two-angle demodulator employing magnetic cores rather than electron discharge devices.

It is another object of this invention to provide an improved two-angle demodulator wherein the angles of demodulation are fixed by the physical characteristics of magnetic cores and the current paths linking the flux in the cores.

It is a further object of this invention to provide an improved color television receiver system including a color demodulator constructed of magnetic elements.

In one aspect, the invention consists of a two-angle demodulator including magnetic core means having two magnetic paths, and coil means providing a current path linking both of said magnetic paths. A two-phase modulated suppressed-carrier signal from a source, and reference oscillations from a source are both coupled to the same current path. The oscillations from the source have a frequency equal to one half that of the suppressed carrier, and have an amplitude much greater than the amplitude of the signal to be demodulated. Two output coils link respective ones of said two magnetic paths. The magnetic paths and the current path are characterized in that different magnetic field strengths are created in the two magnetic paths as a result of a given current in the current path. The magnetic materials employed possess a relatively rectangular hysteresis loop characteristic. Two outputs at different demodulation phase angles are provided from the two output coils by reason of the fact that the flux in the two magnetic paths crosses the high reluctance region of the hysteresis characteristics at different times or phases of the reference oscillations. In another aspect, the invention comprises a color television receiving system including magnetic and current paths as described above, and including a burst synchronized oscillator for generating oscillations in synchronism and phase with the color subcarrier bursts of the received signal, but having a frequency equal to one half that of the bursts. The chrominance signal reproduced in the television receiver is applied together with the local oscillations to the current path linking the two magnetic paths. Two output coils linking the two magnetic paths provide two color difference signals, which may be matrixed to generate a third color difference signal. An integrator is included somewhere between the source of chroma signal and the color difference output applied to the kinescope to cancel the differentiating action which is inherent in the operation of translating the flux variations in the magnetic paths to voltage variations in the output coils.

These and other objects and aspects of the invention will be apparent to those skilled in the art from the following more detailed description taken in conjunction with the appended drawings, wherein.

Figures 1, 2:
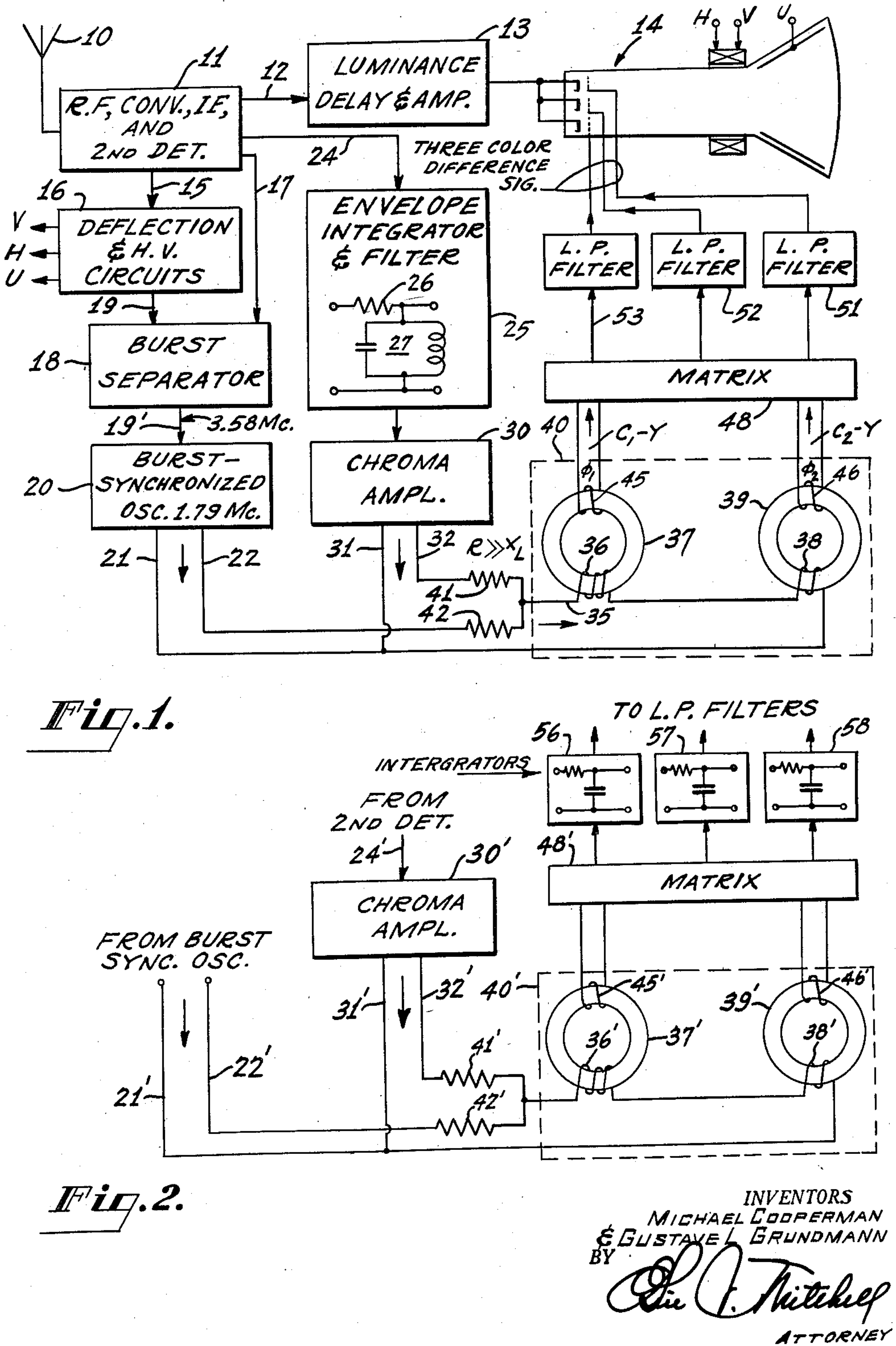
Figure 1 is a block diagram of a color television receiver constructed according to the teachings of this invention and including a magnetic two-angle demodulator system.
Figure 2 is another form of demodulator arrangement which can be substituted for the one included in the receiver system of Figure 1.

Figure 1 shows a color television receiver having an antenna 10 coupled to a box 11 including a radio frequency amplifier, a converter, an intermediate frequency amplifier, and a second detector. One output (not shown) of the second detector is applied to an audio channel for reproducing the audio portion of the television signal. The second output 12 of the second detector is applied through a luminance signal delay and amplifying means 13 to the cathodes of a tricolor kinescope 14. A third output 15 of the second detector is applied to deflection and high voltage circuits 16 having a vertical deflection output V, a horizontal deflection output H, and an ultor voltage output U which are connected to correspondingly designated terminals of the kinescope 14. A fourth output 17 of the second detector is applied to a burst separator 18. The burst separator 18 is also receptive to a flyback pulse over lead 19 from the circuits 16. The burst separator 18 provides an output on lead 19' consisting of bursts of subcarrier oscillations having a frequency of nominally 3.58 megacycles, the frequency of the color subcarrier according to color broadcasting standards in the United States. The output of the burst separator 18 is coupled to a burst-synchronized oscillator 20 having a frequency of oscillation of exactly half that of the frequency of said bursts. The oscillator 20 has an output on leads 21 and 22 having a frequency of nominally 1.79 megacycles, exactly one half the frequency of the color subcarrier.

A fifth output on lead 24 from the second detector is applied to an envelope integrator and filter 25 which may consist of a resistor 26 in series with a tuned circuit 27 which is sharply tuned to 3.58 megacycles. The envelope integrator and filter 25 attenuates the sideband frequency components of the chroma signal in amounts directly proportional to the deviation of the respective components from 3.58 megacycles. This action is equivalent to integrating the color difference signals obtained at the output of the demodulators. The need for performing an integration step at some point in the chroma-demodulation path will become clear as the description proceeds. The envelope integrating action of the resistor 26 and tuned circuit 27 is complex and is described on pages 192–198 of "Vacuum Tube Circuits" by Lawrence B. Arguinbau, Chapman and Hall, 1948. The circuit 26, 27 also acts as a filter to block passage of the lower frequency components constituting the luminance information.

The output of the envelope integrator and filter 25 is applied to a chroma amplifier 30 having output leads 31 and 32. The output of the chroma amplifier 30 and the output of the burst synchronized oscillator 20 are both applied to a current path 35 which includes a coil 36 wound around a magnetic core or path 37 and also a coil 38 wound around a second magnetic core or path 39. Resistors 41 and 42 are provided in the outputs of the chroma amplifier 30 and the oscillator 20, respectively. The resistors 41 and 42 have values of resistance which are very large compared with the reactance of the coils 36 and 38. This relationship is necessary so that the chroma and oscillation currents flowing in the coils 36 and 38 are relatively unaffected by the changes of flux in the cores 37 and 39.

An output coil 45 links magnetic core or path 37, and an output coil 46 links the magnetic core or path 39. The output coils 45 and 46 provide color difference signals designated $C_1-Y$ and $C_2-Y$, respectively. These two color difference signals are coupled to a matrix 48 from which three color difference signals are obtained. The matrix may, for example, be one as shown and described in Patent No. 2,732,425, issued January 24, 1956, to D. H. Pritchard for a Color Television Matrix System. Three color difference signals from the matrix 48 are passed through three low pass filters 51, 52 and 53 to the three control grids of the color kinescope 14. The low pass filters 51, 52 and 53 are employed to remove the 3.58 megacycle and the 1.79 megacycle frequency components from the color difference signals.

In the color receiver system of Figure 1, an envelope integrator 25 is employed in the chrominance signal path prior to the magnetic demodulator 40. The arrangement shown in Figure 2 differs from the arrangemnet in Figure 1 in that three integrators 56, 57 and 58 are employed in the three color difference paths following the magnetic demodulator 40'. Integration is necessary at some point between the chroma output of the second detector and the color difference signal inputs to the grids of the color kinescope 14. Integration is necessary to reverse the differentiating action which is inherent in the operation of the output coils 45 and 46 in translating the flux variations in the cores 37 and 39 to voltage variations.

Figures 7, 8:
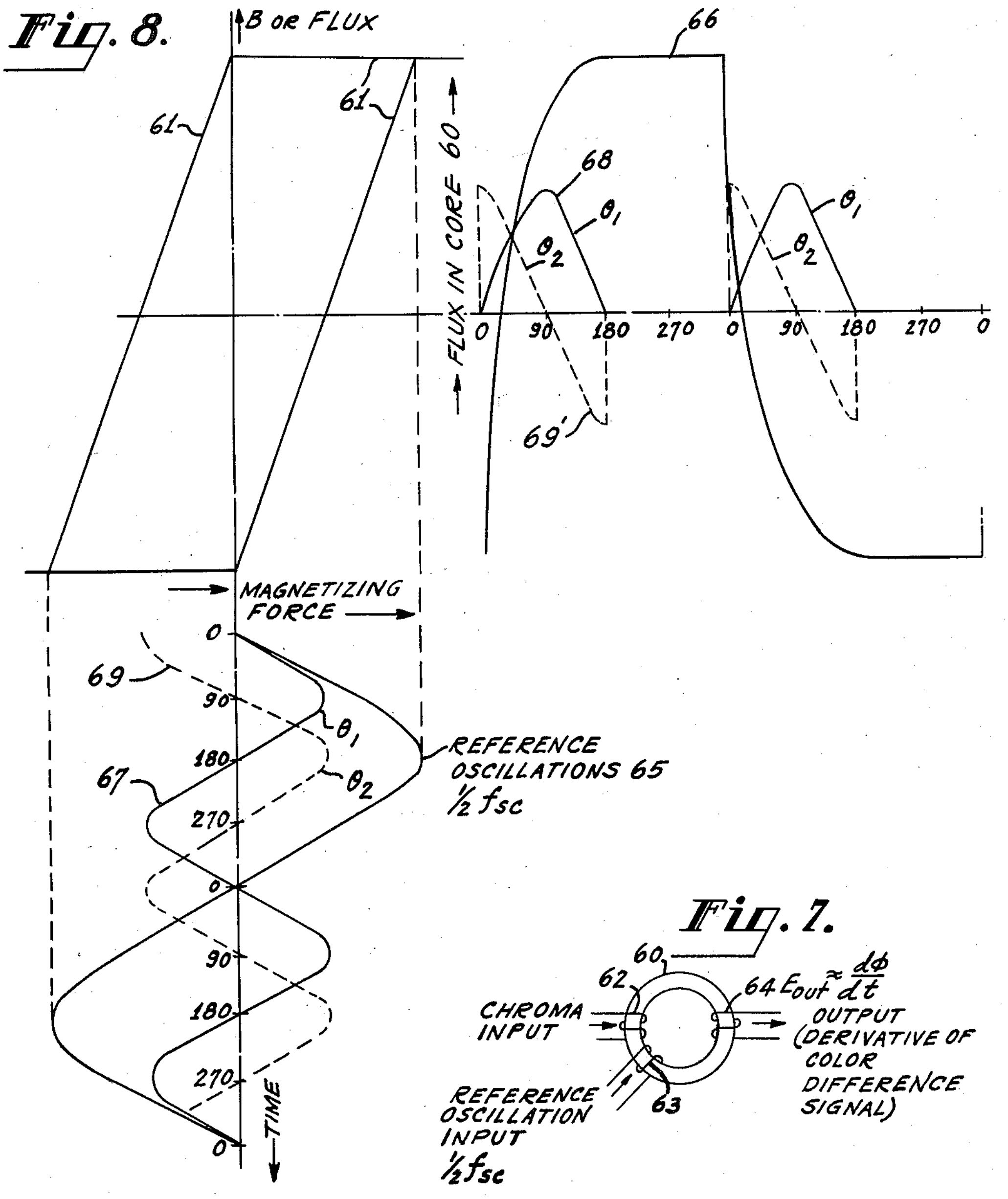
Figure 7 is a diagram showing a single angle demodulator which will be described prior to the description of the two-angle demodulator of this invention.
Figure 8 is a magnetic characteristics chart which will be referred to indescribing the operation of Figure 7.

Before describing the operation of the two-angle magnetic demodulator 40 and 40' in Figures 1 and 2, reference will be made to Figures 7 and 8 for an explanation of the operation of a single magnetic core for demodulation at a single angle. Figure 7 shows a magnetic core 60 constructed of a material having a rectangular hysteresis loop characteristic as illustrated by the idealized curve 61 in Figure 8. Core 60 is linked with a chroma input signal coil 62, a reference oscillation input coil 63 and an output coil 64. The chroma input signal consists of a two-phase amplitude-modulated suppressed-carrier signal wherein the suppressed carrier has a frequency of 3.58 megacycles. The reference oscillations have a frequency equal to one half of 3.58 megacycles or 1.79 megacycles. The chroma signal and the reference oscillations in flowing through the coils 62 and 63 constitute a magnetizing force tending to vary the magnetic flux in the core 60. Referring to Figure 8, the reference oscillations 65 shown at the bottom of the chart produce a variation of flux in the core as represented by the curve 66 at the upper right side of the chart. The chroma signal applied to the coil 62 produces an additional magnetizing force which is superimposed on that produced by the reference oscillations. The portion of the chroma signal having a phase $\theta 1$, represented by curve 67 produces a flux in the core 60 as represented by the curve 68. It will be noted that because the reference oscillations have a frequency one-half that of the chroma signal reference oscillation, and because the hysteresis loop 61 has a flat top and a flat bottom, only the positive half cycles of a wave at phase $\theta 1$ produces a variation of flux in the core 60. At times corresponding with the negative half cycles of the wave of phase $\theta 1$, the core 60 is saturated in one direction or the other so that there is no variation of flux resulting from the input chroma signal. The phase of the chroma input signal designated $\theta 2$ and represented by a dashed curve 69 produces a variation of flux 69' in the core 60 which has as much area above the base line as it has below the base line. The portions above and below the base line cancel each other and provide no low frequency flux corresponding with the chroma phase $\theta 2$. It is thus apparent that a single magnetic core can be employed to provide an output corresponding with one phase of the chroma input signal and not including a signal corresponding with the other quadrature phase of the chroma signal. The reference oscillations permit chroma signal to reach the output coil only when the flux in the core 60 is intermediate the two saturized conditions. The magnetic core 60 with the reference oscillations applied thereto may thus be considered as a switch means for sampling a predetermined phase of the chroma signal.

The curve 68 shows the variation of flux in the core 60 due to the portion of the chroma signal at phase $\theta 1$. The output coil 64 on the core 60 provides an output voltage which is proportional to the derivative of the flux with the respect to time. This is usually represented by the formula $$E=N\frac{d\phi}{dt}$$

where N is the number of turns in the coil 64, and $\phi$ is the flux linking the coil 64. Since the output voltage is the derivative of the flux, and since the flux carries the desired color difference information, it is necessary to integrate the voltage output of the coil 64 to provide a voltage which varies in accordance with the flux in the core 60. The integration can be performed at the output of the coil 64, as shown in Fig. 2, or it can be performed in the chroma signal prior to the application of the chroma signal to the coil 62, as shown in Fig. 1.

The chart of Figure 8 is idealized and includes waveforms which are out of scale with each other for the purpose of illustrating how a core can be employed to extract information at one angle from a chroma signal. It will be understood that two cores may be employed with phase displaced oscillation inputs to obtain two demodulated outputs at corresponding difference phase angles. In actual practice, the amplitude of the reference oscillations applied to the core should be at least ten times as great as the amplitude of the chroma signal applied thereto.

Reference will now be made to Figure 1 and the chart of Figure 9 for an explanation of how demodulation can be performed at two different angles while using a single reference oscillation of given phase. The reference oscillations from the oscillator 20 are applied through a coil 36 on core 37 and through a coil 38 on core 39. The coil 36 is shown as having a greater number of turns than the coil 38. The magnetizing force produced by the oscillations in the coil 36 is represented by the wave 70 in Figure 9, and the magnetizing force of the oscillations in the coil 38 is represented by the wave 72 having a lower amplitude than the wave 70 because coil 36 has more turns than coil 38. The cores 37 and 39 are identical in size and material, and have the same hysteresis loop characteristics 71. The chroma signal applied through the coils 36 and 38 has a much lower amplitude than the reference oscillations. The only time that the chroma signal in the coil 36 can cause a variation in the flux in the coil 37 is during the intervals 73 and 74 when the reference oscillation 70 causes the flux in the core 37 to pass from saturation in one direction to saturation in the other direction. This phase $\phi 1$ of the chroma signal is reflected in a change of flux in the core 37 and a change of voltage in the output coil 45.

The only portion of the chroma signal which appears in the output coil 46 of the core 39 is that occurring during the intervals 75 and 76 when the core 39 is not saturated. It will be noted that the unsaturated phase $\phi 1$ in coil 45 is displaced from the unsaturated phase $\phi 2$ and coil 46 by about 90°. By using appropriately different numbers of turns in the input coils 36 and 38, any two desired demodulating phase angles can be achieved. Once the cores and coils are manufactured, there is no deterioration of, or undesired variation in, the operation of the demodulators such as is encountered with demodulators employing electron discharge devices. The angles of demodulation remain fixed indefinitely.

Figure 3:
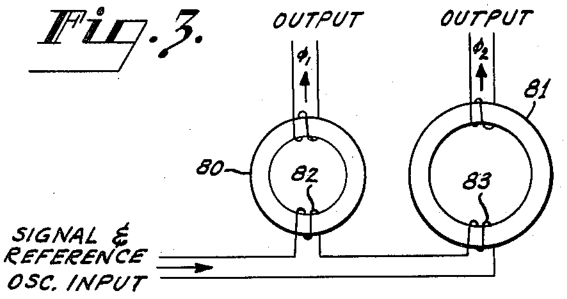
Figure 3 is a diagram illustrating a different arrangement of demodulator cores and coils from that shown in Figures 1 and 2.
Figure 4:
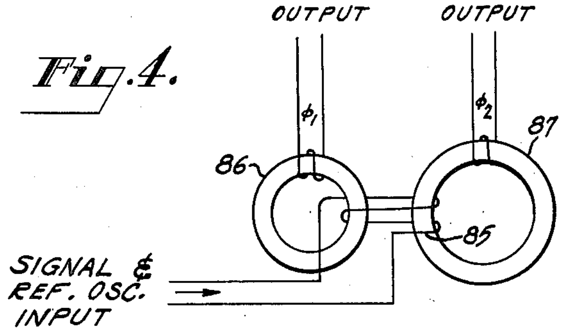
Figure 4 shows another different arrangement of cores and coils.

The same results may be obtained with two cores of the same material but of different sizes, that is, different circumferential lengths or different cross sectional areas. For example, Figure 3 show a first core 80 which is smaller than a second core 81. The energizing windings 82 and 83 have the same number of turns. Therefore, the magnetizing forces per unit length in the two cores are different and may be as illustrated by curves 70 and 72 in Figure 9. The energizing coils 82 and 83 in Fig. 3 may consist of a single coil 85, as shown in Fig. 4, wound around both of the cores 86 and 87.

Figure 5:
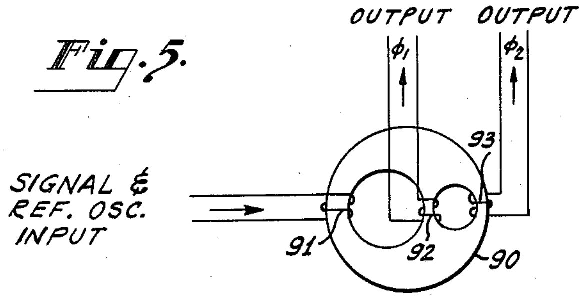
Figure 5 shows still another arrangement of magnetic and current paths.

Figure 5 illustrates still another two-angle demodulator arrangement wherein a two-aperture core or transfluxor 90 is employed. The input signal applied to the input coil 91 provides a magnetizing force for flux in two paths, one of the paths including the leg 92 and the other path including the leg 93. The flux path through the leg 93 is longer than the flux path through the leg 92. Therefore the magnetizing forces per unit length of the flux paths are different and may be as illustrated in Figure 9.

Figure 6:
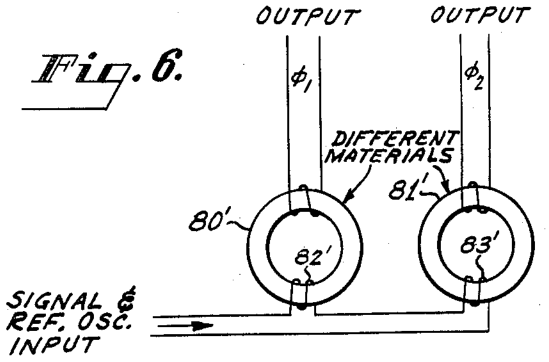
Figure 6 is a further arrangement of paths.

Figure 6 illustrates an arrangement wherein the coils 82′ and 83′ have the same number of turns and the cores 80′ and 81′ are of the same size but are of different materials. The hysteresis loop characteristic of one of the cores is designated 94 in the chart of Figure 10, and the hysteresis loop characteristic of the other core is represented by the dashed line characteristic designated 95. It will be seen that a much lower amplitude of magnetizing force is required to saturate the core having the characteristic 95 than is required to saturate the core having the characteristic 94. When the same amplitude of reference oscillation 96′ is employed as a magnetizing force on the two cores, or two legs, one core is unsaturated during the intervals 96 and 97, while the other core or leg is unsaturated during the intervals 98 and 99. Therefore, during the intervals 96 and 97, a demodulated output signal at the phase angle $\phi 1$ is obtained from one of the cores on legs, and during the intervals 98 and 99 a demodulated signal at the phase angle $\phi 2$ is obtained. It will be noted that the phase angles $\phi 1$ and $\phi 2$ differ by about 90°.

Figure 11:
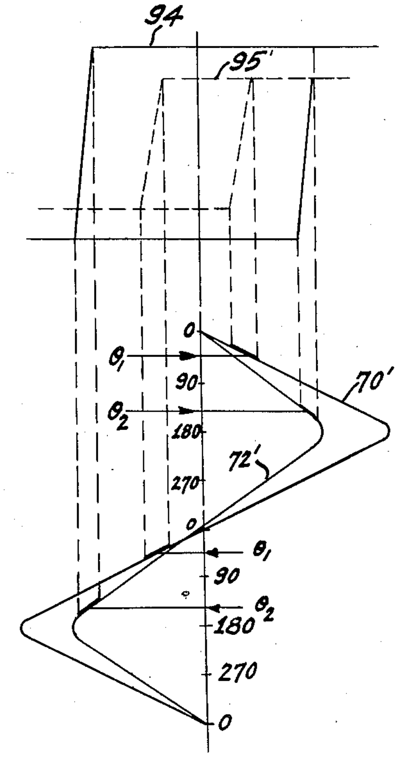
Figure 11 is a generalized chart including the features of Figures 9 and 10.
Figure 9:
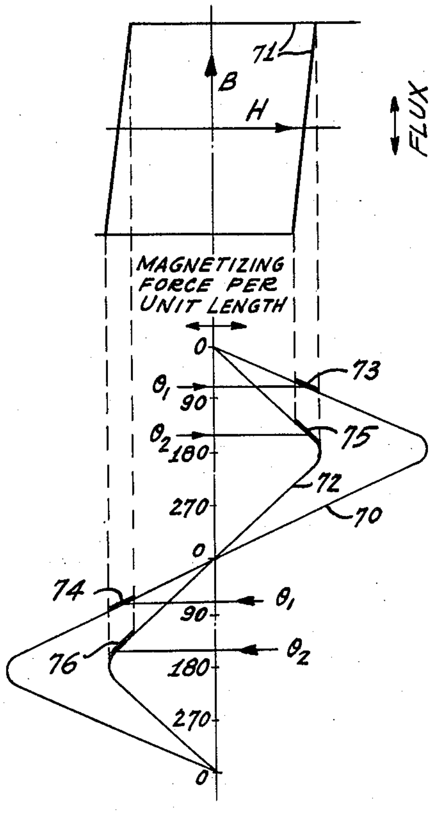
Figure 9 is a magnetic characteristics chart which will be referred to in describing the operation of the forms of two-angle demodulators shown in Figures 1 through 5.
Figure 10:
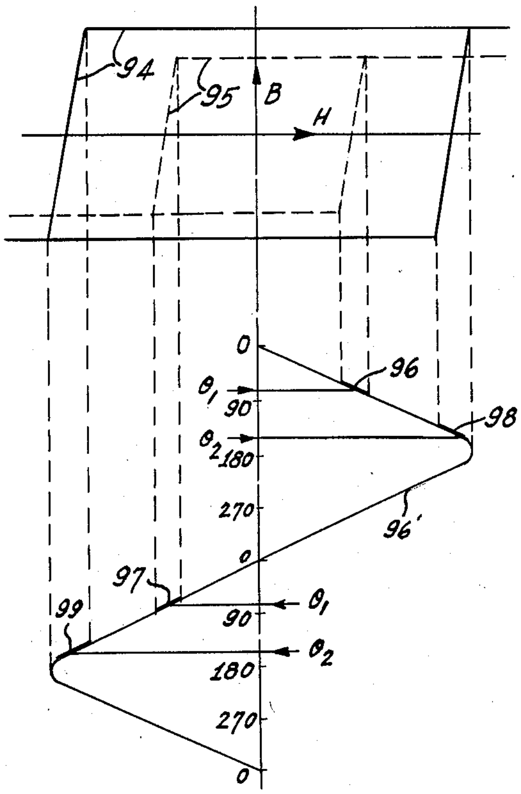
Figure 10 is a magnetic characteristics chart which will be referred to in describing the form of a two-angle demodulator shown in Figure 6.

Operation with two cores of the same material but with different numbers of input coil turns or differen flux path lengths is illustrated in Figure 9. Operation with two cores of differential materials but with the same number of input coil turns and the same flux path length is illustrated in Figure 10. Figure 11 is generalized from Figures 9 and 10 to show how all the factors affecting the two cores may be different.

Figure 12:
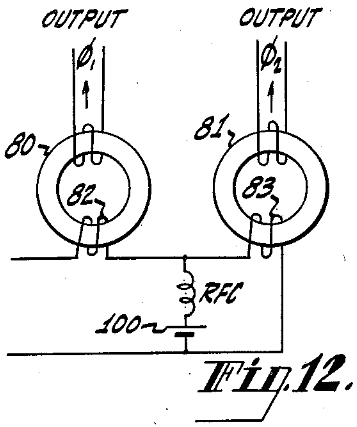
Figure 12 is an arrangement wherein fixed magnetic bias is applied to one of the cores.
Figure 13:
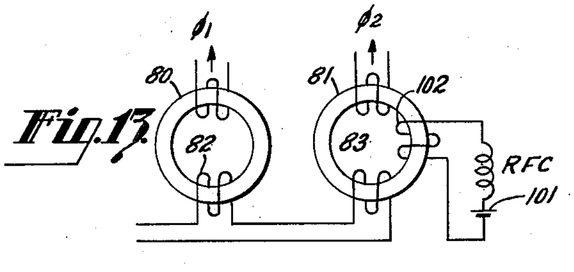
Figure 13 is another fixed bias arrangement.

Figure 12 illustrates a still further arrangement for achieving different magnetic field strengths in the two magnetic paths as the result of a given current in the current path. In this arrangement, the cores 80 and 81 may be identical, and the coils 82 and 83 may be identical. However, an additional fixed magnetic bias is applied to the core 81. Two alternative methods of applying the magnetic bias are illustrated in Figures 12 and 13. The first method of Figure 12 includes a D.C. source 100 and a series radio frequency choke connected in shunt with the coil 83. Substantially no current from the source 100 flows through the coil 82 because of the high impedance of the source of signal and reference oscillations. The other alternative method of Figure 13 includes a source 101 connected through a radio frequency choke to a third winding or coil 102 on the core 81. One of these magnetic biasing arrangements may be used to provide the necessary different characteristics between the two cores, or may be used in conjunction with arrangements shown in other figures of the drawings.

While the invention has been described with reference to Figure 1 as employing a burst-synchronized oscillator 20 having a frequency equal to a one-half submultiple of the burst frequency, the oscillator frequency may be equal to the burst frequency, or may be some other submultiple. If the oscillator frequency is any odd submultiple including unity of the burst frequency, fixed magnetic bias should be provided by a method such as those illustrated in Figure 12. If the oscillator frequency is any even submultiple of the burst frequency, fixed magnetic bias is not required. The use of an oscillator frequency which is one-half the burst frequency is preferred.

In all of the magnetic demodulator arrangements shown in Figures 1 through 6 and 12, there are two magnetic paths and one input current path linking both magnetic paths. Both the reference oscillations and the chroma signal to be demodulated are applied through the single input current path. In all of the arrangements, different magnetic field strengths or numbers of flux lines are created in the two magnetic or flux paths as the result of a given amplitude of input signal in the common current path. In the arrangements of Figures 1 and 2, this result is achieved by having the input current path make more turns linking one core than the other. The cores are identical. In the arrangements of Figures 3 through 5, the number of turns of the current path linking the two flux paths is the same, but the two flux paths differ in length. In the arrangement of Figure 6, only the material is different in the two cores. In Figure 12, constant magnetic bias is added to at least one core.

It is apparent that according to this invention there is provided an improved magnetic two-angle demodulation system wherein the operation of the demodulators is fixed at the time of manufacture and remains fixed indefinitely without the need for maintenance or replacement of circuit elements. It is also apparent that according to this invention there is provided an improved color television receiving system employing magnetic elements for the purpose of demodulating the chrominance signal at two desired different phase angles.

What is claimed is:

1. A two-angle demodulator for demodulating a two-phase modulated suppressed carrier signal from a source, comprising, a source of a reference oscillation having a frequency equal to a submultiple including unity of the frequency of said suppressed carrier, magnetic core means having two magnetic paths, a current path linking said two magnetic paths, means to couple said signal source and said reference oscillation source to said current path, said magnetic paths and said current path being characterized in that different magnetic field strengths are created in said two magnetic paths as the result of a given current in said current path, and output coils linking respective magnetic paths.

2. A two-angle demodulator for demodulating a two-phase modulated suppressed carrier signal from a source, comprising, a source of a reference oscillation having a frequency equal to one half the frequency of said suppressed carrier, magnetic core means having two magnetic paths, a current path linking said two magnetic paths, means to couple said signal source and said reference oscillation source to said current path, said current path having more turns around one of said magnetic paths than around the other magnetic path, and output coils linking respective magnetic paths.

3. A two-angle demodulator for demodulating a two-phase modulated suppressed carrier signal from a source, comprising, a source of a reference oscillation having a frequency equal to one half the frequency of said suppressed carrier, magnetic core means having two magnetic paths, a current path linking said two magnetic paths, means to couple said signal source and said reference oscillation source to said current path, one of said magnetic paths being constituted of a material having a greater coercive force than the other, and output coils linking respective magnetic paths.

4. A two-angle demodulator for demodulating a two-phase modulated suppressed carrier signal from a source, comprising, a source of a reference oscillation having a frequency equal to one-half of said suppressed carrier, magnetic core means having two magnetic paths, a current path linking said two magnetic paths, means to couple said signal source and said reference oscillation source to said current path, one of said magnetic paths being longer than the other, and output coils linking respective magnetic paths.

5. A two-angle demodulator for demodulating a two-phase modulated suppressed carrier signal from a source, comprising, a source of a reference oscillation having a frequency equal to one half the frequency of said suppressed carrier, magnetic core means having two magnetic paths, a current path linking said two magnetic paths, means to couple said signal source and said reference oscillation source to said current path, one of said magnetic paths being constituted by magnetic core means of larger size than the other, and output coils linking respective magnetic paths.

6. A two-angle demodulator for demodulating a two-phase modulated suppressed carrier signal from a source, comprising, a source of a reference oscillation having a frequency equal to a submultiple including unity of the frequency of said suppressed carrier, magnetic core means having two magnetic paths, a current path linking said two magnetic paths, means to couple said signal source and said reference oscillation source to said current path, said magnetic paths and said current path being characterized in that different magnetic field strengths are created in said two magnetic paths as the result of a given current in said current path, output coils linking respective magnetic paths, integrators, and means coupling said output coils to respective integrators.

7. A two-angle demodulator for demodulating a two-phase modulated suppressed carrier signal from a source, comprising, an envelope integrator coupled to said signal source, a source of a reference oscillation having a frequency equal to one half the frequency of said suppressed carrier, magnetic core means having two magnetic paths, a current path linking said two magnetic paths, means to couple the output of said integrator and said reference oscillation source to said current path, said magnetic paths and said current path being characterized in that different magnetic field strengths are created in said two magnetic paths as the result of a given current in said current path, and output coils linking respective magnetic paths.

8. In a color television receiver having a video channel providing a signal wherein chrominance information is in the form of a two-phase modulated suppressed color subcarrier wave, and wherein color demodulator synchronizing information is in the form of bursts of subcarrier frequency oscillations on the back porch immediately following deflection synchronizing pulses, means to demodulate the chrominance information comprising, a burst separator coupled to said video channel to separate said bursts from the balance of the signal, a burst synchronized oscillator coupled to said burst separator and having a frequency equal to one-half the frequency of said color subcarrier bursts, magnetic core means having two magnetic paths, a current path linking said two magnetic paths, means to couple the output of said video channel and the output of said oscillator to said current path, said magnetic paths and said current path being characterized in that different magnetic field strengths are created in said two magnetic paths as the result of a given current in said current path, and output coils linking respective magnetic paths.

9. A two-angle demodulator for demodulating a two-phase modulated suppressed carrier signal from a source, comprising, a source of a reference oscillation having a frequency equal to a submultiple including unity of the frequency of said suppressed carrier, magnetic core means having two magnetic paths, a current path linking said two magnetic paths, means to couple said signal source and said reference oscillation source to said current path, said magnetic paths and said current path being characterized in that different magnetic field strengths are created in said two magnetic paths as the result of a given current in said current path, output coils linking respective magnetic paths, and means to magnetically bias at least one of said cores.

References Cited in the file of this patent

UNITED STATES PATENTS

| | | |
|---|---|---|
| 1,328,610 | Alexanderson | Jan. 20, 1920 |
| 2,696,347 | Lo | Dec. 7, 1954 |
| 2,752,417 | Pritchard | June 26, 1956 |
| 2,779,818 | Adler et al. | Jan. 29, 1957 |
| 2,807,661 | Espenlaub et al. | Sept. 24, 1957 |
| 2,811,580 | Avins | Oct. 29, 1957 |